(12) United States Patent
Guo et al.

(10) Patent No.: US 12,033,183 B2
(45) Date of Patent: Jul. 9, 2024

(54) RECOMMENDATION CONTENT RESOURCE ACQUISITION METHOD AND APPARATUS, DEVICE, MEDIUM, AND PROGRAM PRODUCT

(71) Applicant: Tencent Technology (Shenzhen) Company Limited, Shenzhen (CN)

(72) Inventors: Yubo Guo, Shenzhen (CN); Wenkui Song, Shenzhen (CN); Xiaoguang Zhuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/973,396

(22) Filed: Oct. 25, 2022

(65) Prior Publication Data
US 2023/0042070 A1     Feb. 9, 2023

Related U.S. Application Data

(63) Continuation of application No. PCT/CN2022/077317, filed on Feb. 22, 2022.

(30) Foreign Application Priority Data

Mar. 1, 2021     (CN) .......................... 202110227787.5

(51) Int. Cl.
*G06Q 30/0251*     (2023.01)
(52) U.S. Cl.
CPC ................................ *G06Q 30/0251* (2013.01)
(58) Field of Classification Search
CPC ........... G06Q 30/0251; G06Q 30/0271; G06Q 30/0277; G06F 16/9535; G06F 16/9538
(Continued)

(56) References Cited

U.S. PATENT DOCUMENTS

| 9,661,374 B1* | 5/2017 | Erdmann .......... H04N 21/41407 |
| 10,311,483 B2* | 6/2019 | Nath .................. G06Q 30/0255 |

(Continued)

FOREIGN PATENT DOCUMENTS

| CN | 102752371 A | 10/2012 |
| CN | 106325935 A | 1/2017 |

(Continued)

OTHER PUBLICATIONS

F.O. Isinkaye, Recommendation systems: Principles, methods and evaluation, 2015 (Year: 2015).*

(Continued)

*Primary Examiner* — Tarek Elchanti
(74) *Attorney, Agent, or Firm* — Morgan, Lewis & Bockius LLP

(57) ABSTRACT

A recommendation content resource acquisition method includes receiving a recommendation content display request based on a target application; acquiring a first recommendation content resource and a second recommendation content resource based on the recommendation content display request, the first recommendation content resource being a recommendation content resource loaded in real time, and the second recommendation content resource being a preloaded recommendation content resource. The method includes determining a target recommendation content resource from the first recommendation content resource and the second recommendation content resource according to a current device state of a terminal indicative of a running status of the terminal; and loading the target recommendation content resource on the target application.

20 Claims, 5 Drawing Sheets

(58) Field of Classification Search
USPC .................................................. 705/14.49
See application file for complete search history.

(56) References Cited

U.S. PATENT DOCUMENTS

| | | | | |
|---|---|---|---|---|
| 2002/0198993 A1* | 12/2002 | Cudd | ............... | G06F 16/9574 709/219 |
| 2011/0153426 A1* | 6/2011 | Reddy | ............... | G06Q 30/02 705/14.58 |
| 2012/0254970 A1 | 10/2012 | Sathish | | |
| 2015/0379160 A1* | 12/2015 | Avraham | ............ | G06F 3/0481 715/767 |

FOREIGN PATENT DOCUMENTS

| CN | 106469073 A | 3/2017 |
|---|---|---|
| CN | 110149540 A | 8/2019 |
| CN | 110874759 A | 3/2020 |
| CN | 111260396 A | 6/2020 |
| CN | 112131411 A | 12/2020 |
| CN | 112423123 A | 2/2021 |
| CN | 112990964 A | 6/2021 |

OTHER PUBLICATIONS

Tencent Technology, ISR, PCT/CN2022/077317, May 9, 2022, 2 pgs.
Tencent Technology, WO, PCT/CN2022/077317, May 9, 2022, 5 pgs.
Tencent Technology, IPRP, PCT/CN2022/077317, Aug. 29, 2023, 6 pgs.

* cited by examiner

RECOMMENDATION CONTENT RESOURCE ACQUISITION METHOD AND APPARATUS, DEVICE, MEDIUM, AND PROGRAM PRODUCT

CROSS-REFERENCE TO RELATED APPLICATIONS

This application is a continuation application of PCT Patent Application No. PCT/CN2022/077317, entitled "RECOMMEND HOW TO OBTAIN CONTENT RESOURCES, DEVICES, DEVICES, MEDIA, AND PROGRAM PRODUCTS" filed on Feb. 22, 2022, which claims priority to Chinese Patent Application No. 202110227787.5, filed with the State Intellectual Property Office of the People's Republic of China on Mar. 1, 2021, and entitled "RECOMMENDATION CONTENT RESOURCE ACQUISITION METHOD AND APPARATUS, DEVICE, AND MEDIUM", all of which are incorporated herein by reference in their entirety.

FIELD OF THE TECHNOLOGY

Embodiments of this application relate to the field of computer technologies, and in particular, to a recommendation content resource acquisition method and apparatus, a device, a medium, and a program product.

BACKGROUND OF THE DISCLOSURE

A splash screen advertisement is advertisement content that is displayed for a fixed duration at the start of an application in a terminal. After the advertisement content is displayed, an interface corresponding to the advertisement content is automatically closed and the application enters an application interface.

The splash screen advertisement is a preloaded advertisement, which is loaded first and then charged. In the related art, the terminal first preloads multiple pieces of candidate advertisement content into an internal memory for storage. When the application is started, the application directly displays the preloaded advertisement content, or returns a list corresponding to the preloaded candidate advertisement content to an advertisement playback platform. The advertisement playback platform determines the optimal advertisement content, and then the terminal loads the advertisement content.

However, because the preloaded advertisement content is generally acquired before an advertisement display opportunity appears on the application, there is a problem of poor real-time performance in the splash screen advertisement loaded in the foregoing manner.

SUMMARY

This application provides a recommendation content resource acquisition method and apparatus, a device, a medium, and a program product, which can improve the loading efficiency of the recommendation content resource. The technical solutions are as follows.

According to an aspect, a recommendation content resource acquisition method is provided, performed by a terminal, the method including:
receiving a recommendation content display request based on a target application;
acquiring a first recommendation content resource and a second recommendation content resource based on the recommendation content display request, the first recommendation content resource being a recommendation content resource loaded in real time, and the second recommendation content resource being a preloaded recommendation content resource;
determining a target recommendation content resource from the first recommendation content resource and the second recommendation content resource according to a current device state of the terminal indicative of a running status of the terminal; and
loading the target recommendation content resource on the target application.

According to another aspect, a recommendation content resource acquisition method is provided, performed by a terminal, the method including: receiving an application start operation of a target application;
loading and displaying a target recommendation content resource on a recommendation content display interface, the target recommendation content resource being a recommendation content resource determined from an acquired first recommendation content resource and an acquired second recommendation content resource according to a current device state of the terminal, the first recommendation content resource being a recommendation content resource loaded in real time, the second recommendation content resource being a preloaded recommendation content resource, and the device state indicating a running status of the terminal; and
displaying an application interface of the target application in response to an end of display of the target recommendation content resource, the application interface being used for displaying application content of the target application.

According to another aspect, a recommendation content resource acquisition method is provided, the method being performed by a recommendation content resource platform, and including:
receiving a resource acquisition request transmitted by a terminal;
determining a first recommendation content resource and a second recommendation content resource based on the resource acquisition request, the first recommendation content resource being a recommendation content resource loaded in real time, and the second recommendation content resource being a preloaded recommendation content resource; and
transmitting the first recommendation content resource and the second recommendation content resource to the terminal, the terminal being configured to determine a target recommendation content resource from the first recommendation content resource and the second recommendation content resource according to a current device state, the device state indicating a running status of the terminal, and the terminal being configured to load the target recommendation content resource on a target application.

According to another aspect, a recommendation content resource acquisition apparatus is provided, the apparatus including:
a first receiving module, configured to receive a recommendation content display request based on a target application;
a first acquisition module, configured to acquire a first recommendation content resource and a second recommendation content resource based on the recommendation content display request, the first recommendation content resource being a recommendation content resource loaded in real time, and the second recommendation content resource being a preloaded recommendation content resource;

a first determining module, configured to determine a target recommendation content resource from the first recommendation content resource and the second recommendation content resource according to a current device state of the terminal, the device state indicating a running status of the terminal; and a first loading module, configured to load the target recommendation content resource on the target application.

According to another aspect, a recommendation content resource acquisition apparatus is provided, the apparatus including:

an operation receiving module, configured to receive an application start operation of a target application; and a display module, configured to load and display a target recommendation content resource on a recommendation content display interface, the target recommendation content resource being a recommendation content resource determined from an acquired first recommendation content resource and an acquired second recommendation content resource according to a current device state of a terminal, the first recommendation content resource being a recommendation content resource loaded in real time, the second recommendation content resource being a preloaded recommendation content resource, and the device state indicating a running status of the terminal, the display module being further configured to display an application interface of the target application in response to an end of display of the target recommendation content resource, the application interface being used for displaying application content of the target application.

According to another aspect, a recommendation content resource acquisition apparatus is provided, the apparatus including:

a second receiving module, configured to receive a resource acquisition request transmitted by a terminal;

a second acquisition module, configured to determine a first recommendation content resource and a second recommendation content resource based on the resource acquisition request, the first recommendation content resource being a recommendation content resource loaded in real time, and the second recommendation content resource being a preloaded recommendation content resource; and a second transmission module, configured to transmit the first recommendation content resource and the second recommendation content resource to the terminal, the terminal being configured to determine a target recommendation content resource from the first recommendation content resource and the second recommendation content resource according to a current device state, the device state indicating a running status of the terminal, and the terminal being configured to load the target recommendation content resource on a target application.

According to another aspect, a computer device is provided, including a processor and a memory, the memory storing at least one instruction, at least one program, a code set, or an instruction set, and the at least one instruction, the code set or the instruction set being loaded and executed by the processor to implement the recommendation content resource acquisition method according to any one of the foregoing embodiments of this application.

According to another aspect, a computer-readable storage medium is provided, storing at least one instruction, at least one program, a code set, or an instruction set, the at least one instruction, the at least one program, the code set or the instruction set being loaded and executed by a processor to implement the recommendation content resource acquisition method according to any one of the foregoing embodiments of this application.

According to another aspect, a computer program product or a computer program is provided, including computer instructions, the computer instructions being stored in a computer-readable storage medium. A processor of a computer device reads the computer instructions from the computer-readable storage medium and executes the computer instructions to cause the computer device to perform the recommendation content resource acquisition method according to any one of the foregoing embodiments.

The technical solutions according to the embodiments of this application include at least the following beneficial effects:

When a target application needs to display recommendation content, a target recommendation content resource is determined from a first recommendation content resource and a second recommendation content resource according to a current device state of a terminal, where the first recommendation content resource is a recommendation content resource that needs to be loaded in real time, and the second recommendation content resource is a recommendation content resource that has been preloaded. The terminal determines whether to use the preloaded recommendation content resource or the recommendation content resource loaded in real time according to the current device state, which can adaptively improve the real-time performance and loading efficiency of the loaded recommendation content resource according to the device state of the terminal.

DESCRIPTION OF EMBODIMENTS

Figure 1:
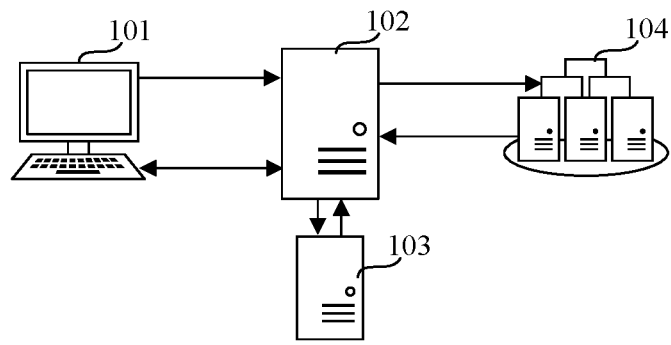
FIG. 1 is a schematic diagram of an implementation environment according to an exemplary embodiment of this application.

First, terms involved in the embodiments of this application are briefly introduced.

Recommendation content: When a user uses an application in a terminal, a server corresponding to the application recommends content that can better meet the user interest to the user according to the user portrait. Recommendation content includes various forms of content, such as video content, image content, and text content, and the specific implementation includes advertisement.

Splash screen advertisement: A splash screen advertisement is advertisement content that is displayed for a fixed duration at the start of an application in a terminal. After the advertisement content is displayed, an interface corresponding to the advertisement content is automatically closed and the application enters an application interface. The splash screen advertisement is displayed to the user in full-screen and seconds-long high exposure formats and instantaneously captures attention of the user with strong visual impacts when the application is started, to achieve full exposure of advertisement information.

Advertisement exchange (ADX) platform: An Internet ADX platform connects a demand-side platform (DSP) and a sell-side platform (SSP), and collects a large amount of media traffic by accessing the SSP, to collect and process data belonging to target customers of the advertisement. The ADX is an exchange place for precision marketing. Because an advertiser/agent having a back-end advertisement retrieval service can independently access the ADX platform to place advertisement content and implement protocol adaptation and traffic screening, the advertiser/agent can update the placed advertisement content in real time, and the advertisement resource is frequently updated.

Direct placement engine: Different from the ADX platform, a direct placement engine is an advertisement placement platform provided by a fixed developer. An advertiser having no back-end advertisement retrieval service may place advertisement content to the direct placement engine, and the direct placement engine completes the retrieval service and then provides the advertisement content for an advertisement playback platform provided by the same developer to carry out an advertisement push service. Compared with the advertisement content provided by the ADX platform, the advertisement content provided by the direct placement engine is updated at a lower frequency.

Blockchain: A blockchain is a new application mode of computer technologies such as distributed data storage, point-to-point transmission, a consensus mechanism, and an encryption algorithm. A blockchain underlying platform may include processing modules such as a basic service module, an intelligent contract module, and an operation module. A platform product service layer provides basic capabilities and an implementation framework of a typical application. Based on these basic capabilities, developers may superpose characteristics of services and complete blockchain implementation of service logic. An application service layer provides a blockchain solution-based application service for use by a service participant.

In the embodiments of this application, a target recommendation content resource is determined by a terminal, and the back-end advertisement engine (including the direct placement engine and the ADX platform) is not easy to determine whether recommendation content transmitted to the terminal is exposed. Therefore, after the terminal determines the target recommendation content resource, the intelligent contract may be used to write a resource identifier corresponding to the target recommendation content resource, a display time of the target recommendation content resource, and a terminal identifier into the blockchain jointly, so as to facilitate the back-end advertisement engine to read related information from the blockchain. That is, resource exchange between the back-end advertisement engine and the terminal is implemented by the blockchain, and advertisement exposure and click information are added to the blockchain by the terminal. Therefore, the advertisement exposure and click information are not easy to be tampered with by one of the platforms, and the data is more secure and reliable.

An implementation environment according to an embodiment of this application is described with reference to the foregoing brief introduction of the terms.

Referring to FIG. 1, the implementation environment includes a terminal 101, an advertisement resource platform 102, a direct placement engine 103, and an ADX platform 104.

A target application is installed and run in the terminal 101, and a splash screen advertisement is loaded when the target application is started. The terminal 101 may be a smartphone, a tablet computer, a portable computer, a desktop computer, or the like. In some embodiments, the target application may be implemented as application software or a web page.

The advertisement resource platform 102 is a backend basic platform for the target application to display advertisements. The advertisement resource platform 102 may collect traffic information, user information, and the like corresponding to the advertisement content placed to the target application and provide a targeted advertising service. The advertisement resource platform 102 further includes a back-end advertisement engine, and the back-end advertisement engine is configured to provide an advertisement resource to be placed to the target application in the terminal 101 for display. Before the advertisement resource platform 102 transmits the advertisement resource to the terminal 101, the advertisement resource platform 102 may estimate a click-through rate and a conversion rate corresponding to the advertisement resource, and may sort click-through rates or conversion rates of multiple advertisement resources, to determine an advertisement resource to be transmitted to the terminal.

The back-end advertisement engine includes a direct placement engine 103 and an ADX platform 104. The developer corresponding to the direct placement engine 103 is the same as or has an association relationship with the developer corresponding to the target application. An advertisement resource directly placed to the advertisement resource platform 102 is stored into the direct placement engine 103, and targeted retrieval is performed by the direct placement engine 103. The ADX platform 104 is an externally accessed advertisement resource platform. In addition to the advertisement directly placed to the advertisement resource platform, there is also an advertisement that is accessed through a back-end retrieval service set up by an agent or advertiser, and this type of advertisement is uniformly connected to the ADX platform 104 for protocol adaptation and traffic screening. The ADX platform 104 further provides a service of participating in advertisement bidding.

An application scenario according to an embodiment of this application is described with reference to the foregoing term explanations and implementation environment.

Figure 2:
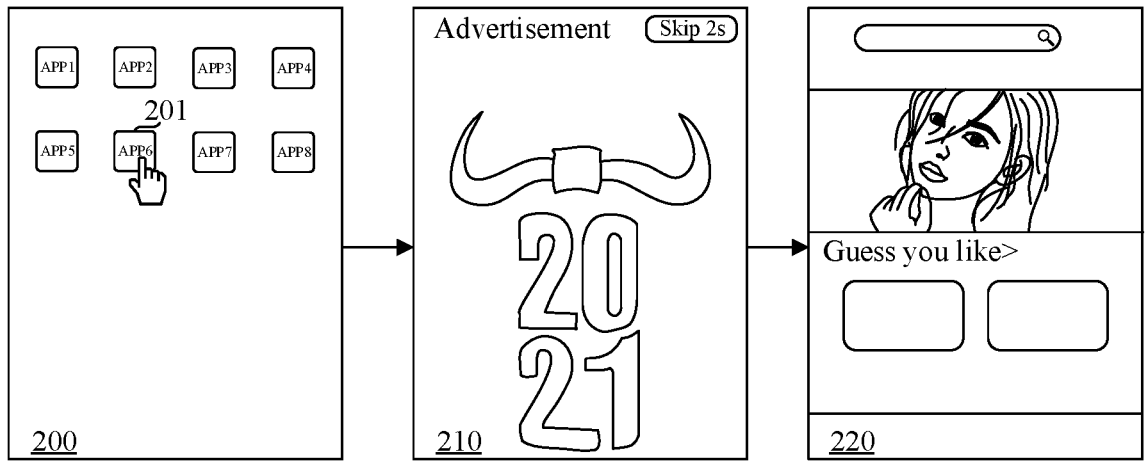
FIG. 2 is a schematic diagram of an application scenario according to an exemplary embodiment of this application.

A target application is installed and run in a terminal, a splash screen advertisement is loaded when the target application is started, and the splash screen advertisement is displayed for a fixed duration. In an example, as shown in FIG. 2, the user selects to start a target application 201 in a terminal interface 200, the terminal displays a first display interface 210 of the target application 201, and splash screen advertisement content is displayed in the first display interface 210. After the first display interface 210 is displayed for a fixed duration (for example, 5 seconds), a second display interface 220 of the target application 201 is displayed, and the second display interface 220 is an interface of the target application for providing application functions. Exemplarily, the first display interface 210 may be automatically switched to the second display interface 220 after a fixed duration, or may be manually switched to the second display interface 220 by the user through a preset control.

In some embodiments, the target application includes, but is not limited to, one of the following applications: video application software, news application software, game application software, social application software, shopping application software, and the like.

In some implementation technologies, the target application in the terminal acquires the advertisement resource of the splash screen advertisement in the following two stages: a pre-pull stage and a real-time pull stage. In the pre-pull stage, the target application initiates a resource pre-pull request to the advertisement resource platform when the target application is, for example, installed or started for the first time. The advertisement resource platform acquires a candidate advertisement list and advertisement resources corresponding to the list from the direct placement engine and the ADX platform according to the resource pre-pull request, and returns the candidate advertisement list and the advertisement resources to the terminal, and the terminal stores the candidate advertisement list and the advertisement resources. In the real-time pull stage, the target application transmits the candidate advertisement list to the advertisement resource platform when being started. The advertisement resource platform determines whether the advertisement resources in the list are effective, performs retrieval on the currently effective advertisement resources, and returns a determined optimal advertisement resource. The target application in the terminal acquires advertisement content corresponding to the advertisement resource from a memory and displays the acquired advertisement content.

In the process of acquiring advertisement resources using a method in the foregoing implementation technology, because the ADX platform needs to implement a mandatory recall function for the advertisement list, this function requires the ADX platform and the advertiser and/or agent to develop the corresponding backend, and the corresponding development cost is relatively large. In addition, selecting advertisement resources only according to the advertisement list cached by the terminal has problems of poor real-time performance and low efficiency.

In some embodiments of this application, the terminal acquires at least one first advertisement resource and at least one second advertisement resource according to an advertisement resource display request, where the first advertisement resource is an advertisement resource loaded in real time and the second advertisement resource is a preloaded advertisement resource. Then, the terminal determines a target advertisement resource for being loaded to the target application from the first advertisement resource and the second advertisement resource according to a device state of the terminal. The terminal determines whether to use the preloaded advertisement resource or the advertisement resource loaded in real time as the advertisement resource to be loaded on the target application according to the current device state, which improves the real-time performance and loading efficiency of the loaded advertisement resource.

Figure 3:
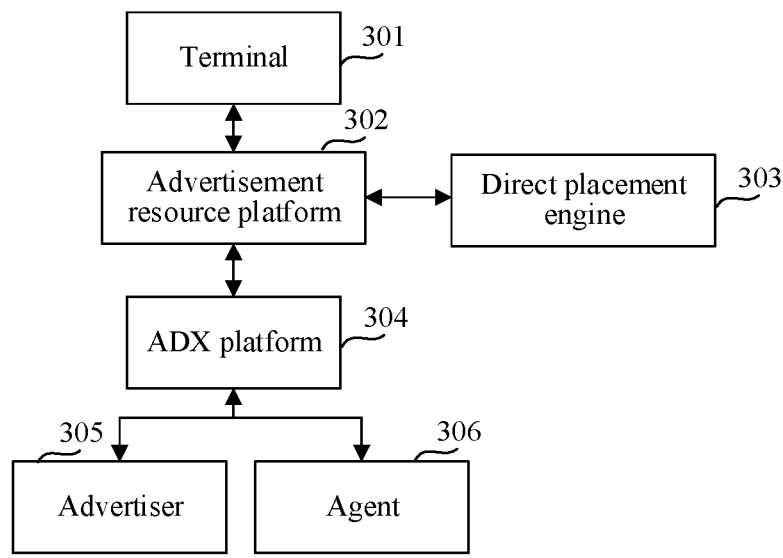
FIG. 3 shows an advertisement resource acquisition system in the related art of this application.

In some embodiments, as shown in FIG. 3, in the pre-pull stage: a terminal 301 initiates a pre-pull request to an advertisement resource platform 302. After acquiring the pre-pull request, the advertisement resource platform 302 acquires an advertisement list from a direct placement engine 303 and returns the advertisement list to the terminal 301. The terminal 301 loads advertisement resources in the list from the advertisement resource platform 302 one by one according to the advertisement list, and stores the advertisement resources into a preset storage area.

In the real-time pull stage: the terminal 301 generates a preload completion list according to locally-stored advertisement resources and transmits the preload completion list to the advertisement resource platform 302. The advertisement resource platform 302 transmits the preload completion list to the direct placement engine 303, and the direct placement engine 303 determines an optimal advertisement resource according to the preload completion list, and returns the optimal advertisement resource to the terminal 301. Meanwhile, the advertisement resource platform 302 acquires an optimal advertisement resource from an ADX platform 304, where the ADX platform 304 acquires advertisement resources from an advertiser 305 and an agent 306, and returns the optimal advertisement resource to the terminal 301. According to the current device state, the terminal 301 determines whether to display the optimal advertisement resource of the direct placement engine 303 (which has been preloaded to the terminal 301) or to display the optimal advertisement resource of the ADX platform 304 in real time.

Figure 4:
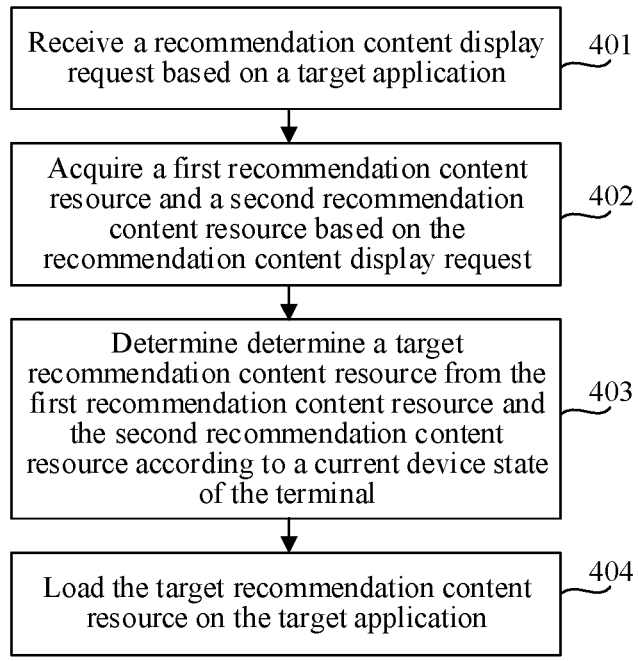
FIG. 4 is a flowchart of an advertisement resource acquisition method according to an exemplary embodiment of this application.

FIG. 4 shows a recommendation content resource acquisition method according to an exemplary embodiment of this application. In this embodiment of this application, description is made by using an example in which the method is performed by a terminal, and the method includes the following steps.

Step 401: Receive a recommendation content display request based on a target application.

The target application is installed in the terminal. The target application may be one piece of application software or may be multiple pieces of application software, where if the target application is different pieces of application software, the different pieces of application software may respectively display the same recommendation content resource or different recommendation content resources when being started. Exemplarily, when the target application is different pieces of application software, the recommendation content resource loaded to the first application software may be shared with other application software in a manner of sharing a resource pool, to achieve recommendation content resource exchange between multiple applications.

In this embodiment of this application, a preloaded recommendation content resource is stored in the terminal. Exemplarily, the preloaded recommendation content resource is stored into the preset storage area of the terminal during the installation process of the target application. Alternatively, the preloaded recommendation content resource is stored to the preset storage area of the terminal when the target application is started for the first time. Alternatively, the preloaded recommendation content resource is acquired by the terminal from the recommendation content resource platform within a preset time period, and the preloaded recommendation content resource that has been stored in the preset storage area is updated. Alternatively, the preloaded recommendation content resource is acquired by the terminal from the recommendation content resource platform when the terminal detects that a current terminal network connection is to a wireless fidelity network, and the preloaded recommendation content resource that has been stored in the preset storage area is updated.

The preloaded recommendation content resource further corresponds to a preloaded resource list. The preloaded resource list is also transmitted to the terminal by the recommendation content resource platform, and stored in the preset storage area by the terminal. Exemplarily, the terminal transmits a preload request to the recommendation content resource platform, and the recommendation content resource platform determines a preloaded recommendation content resource and a preloaded resource list based on the preload request; the preloaded resource list returned by the recommendation content resource platform is received; and based on the preloaded resource list, a preload resource is acquired from the recommendation content resource platform, and stored into the preset storage area of the terminal.

In some embodiments, the manner of storing preloaded recommendation content resources includes, but is not limited to, at least one of the following manners: 1. Store multiple preloaded recommendation content resources into the preset storage area according to the order of sizes of the preloaded recommendation content resources. 2. Store multiple preloaded recommendation content resources into the preset storage area according to the order of correlation degrees between the recommendation content types corresponding to the preloaded recommendation content resources and the target application. 3. Store multiple preloaded recommendation content resources into the preset storage area according to bidding levels corresponding to the preloaded recommendation content resources.

In some embodiments, the recommendation content display request may be generated when the target application is started. That is, when the user starts the target application, the target application generates a recommendation content display request, and the terminal processes the recommendation content display request after receiving the recommendation content display request. Alternatively, the recommendation content display request may be generated when the application interface of the target application is switched. Exemplarily, a first application interface corresponding to the target application is displayed, and a recommendation content display request is generated in response to receiving a switching operation of switching the first application interface to a second application interface. Alternatively, the recommendation content display request may be generated during a time period during which the target application loads the target application resource. For example, when the target application is a video playback application, during a waiting stage during which the target application loads the video content, the recommendation content display request is generated to display the recommendation content resource.

For the display of the recommendation content resource, the target application provides the user with an option of being no specific to personal characteristics of the user, or provides the user with an option of conveniently closing the displayed recommendation content resource. If the user selects to close the displayed recommendation content resource, the target application immediately stops providing the related service. The target application provides the user with a function for selecting or deleting device state information recorded for a content recommendation service.

Step 402: Acquire a first recommendation content resource and a second recommendation content resource based on the recommendation content display request.

In this embodiment of this application, after receiving the recommendation content display request, the terminal acquires at least one first recommendation content resource and at least one second recommendation content resource from the recommendation content resource platform. The first recommendation content resource is a recommendation content resource loaded in real time. If the terminal displays the first recommendation content resource, the terminal acquires recommendation content corresponding to the first recommendation content resource in real time from the recommendation content resource platform, and displays the acquired recommendation content. The second recommendation content resource is a preloaded recommendation content resource. If the terminal displays the second recommendation content resource, the terminal reads recommendation content corresponding to the second recommendation content resource from the preset storage area of the terminal, and displays the read recommendation content.

Exemplarily, the method of acquiring at least one first recommendation content resource from the recommendation content resource platform by the terminal includes the following. Based on the recommendation content display request, a resource acquisition request is transmitted to the recommendation content resource platform. After receiving the resource acquisition request, the recommendation content resource platform transmits a back-end resource acquisition request to the ADX platform. The ADX platform acquires multiple first recommendation content resources from a recommendation content library of each advertiser and/or agent accessed, and returns the multiple first recommendation content resources to the recommendation content resource platform. The recommendation content resource platform sorts the multiple first recommendation content resources according to a preset rule, and determines at least one first recommendation content resource used for being returned to the terminal, where the preset rule may be the value of the click-through rate or conversion rate corresponding to the recommendation content resource, or the bidding level corresponding to the recommendation content resource, which is not limited herein.

Exemplarily, the method of acquiring at least one second recommendation content resource from the recommendation content resource platform by the terminal includes the following. Based on the recommendation content display request, a preload completion list is transmitted to the recommendation content resource platform. The preload completion list includes recommendation content resources that have been preloaded. The recommendation content resource platform determines at least one second recommendation content resource from the preload completion list. In an example, the preloaded resource list includes a recommendation content resource A, a recommendation content resource B, a recommendation content resource C, and a recommendation content resource D. After receiving the preloaded resource list, the terminal downloads the four recommendation content resources in order and stores the four recommendation content resources into the preset storage area. When the recommendation content display request is received during the loading of the recommendation content resource C by the terminal, the corresponding preload completion list includes the recommendation content resource A and the recommendation content resource B, and the terminal transmits the preload completion list to the recommendation content resource platform. Alternatively, based on the recommendation content display request, a resource acquisition request is transmitted to the recommendation content resource platform. The resource acquisition request includes a terminal identifier, and the recommendation content resource platform determines, according to the terminal identifier, a preloaded resource list transmitted to the terminal in a preload stage. The recommendation content resource platform determines at least one second recommendation content resource according to the preloaded resource list, and returns the at least one second recommendation content resource to the terminal. The terminal determines a preloaded recommendation content resource from the at least one second recommendation content resource. That is, the recommendation content resource platform can determine which recommendation content resources have been preloaded by the terminal currently according to the received preload completion list, to determine which recommendation content resources can be quickly displayed by the terminal, thereby improving the efficiency of the recommendation content resource platform in determining the second recommendation content resource.

In some embodiments, the terminal acquires resource information corresponding to the recommendation content resource from the recommendation content resource platform, to determine a first recommendation content resource and a second recommendation content resource screened out by the recommendation content resource platform. That is, the terminal acquires first resource information corresponding to the first recommendation content resource and second resource information corresponding to the second recommendation content resource from the recommendation content resource platform. In some embodiments, the resource information includes, but is not limited to, at least one of resource identifier, resource size information, resource form information, and the like. The resource identifier is used to uniquely identify the recommendation content resource. After determining the loaded target recommendation content resource, the terminal can read resource data corresponding to the corresponding recommendation content resource from the preset storage area or from the recommendation content resource platform through the corresponding resource identifier. The resource size information is used to indicate the size of the resource that the recommendation content resource occupies when stored or displayed. The resource form information is used to indicate the display form of the recommendation content resource, for example, a video form or an image form.

Step 403: Determine a target recommendation content resource from the first recommendation content resource and the second recommendation content resource according to a current device state of the terminal.

In this embodiment of this application, the device state is used to indicate a running status of the terminal. Exemplarily, the running status includes, but is not limited to, a terminal running status such as a network connection state or a backend internal memory usage status.

Exemplarily, description is made by using an example in which the device state includes the network connection. After acquiring at least one first recommendation content resource and at least one second recommendation content resource, the terminal determines a current network connection, and determines a target recommendation content resource from the at least one first recommendation content resource and the at least one second recommendation content resource based on the network connection state. In an example, the target recommendation content resource is determined from at least one first recommendation content resource in response to the network connection state being a first network state. Alternatively, the target recommendation content resource is determined from at least one second recommendation content resource in response to the network connection state being a second network state. The terminal has a faster network transmission speed in the first network state than in the second network state. For example, the target recommendation content resource is determined from at least one first recommendation content resource in response to the network connection state being a state of being connected to a wireless fidelity network or a 5G network. Alternatively, the target recommendation content resource is determined from at least one second recommendation content resource in response to the network connection state being a state of being connected to a cellular network (2G, 3G, 4G or another network). That is, when the network connection state has a relatively fast network transmission speed, the terminal can complete the loading process of the recommendation content resource relatively quickly even by loading the recommendation content resource in real time, which ensures the real-time performance of the recommendation content resource. When the network transmission speed is relatively slow, the terminal can display the preloaded recommendation content resource, thereby ensuring the display efficiency of the recommendation content resource when the network transmission speed is relatively slow.

Exemplarily, description is made by using an example in which the device state includes the backend internal memory usage status. After acquiring at least one first recommendation content resource and at least one second recommendation content resource, the terminal determines the backend internal memory usage status currently corresponding to the target application. The target recommendation content resource is determined from the at least one first recommendation content resource and the at least one second recommendation content resource based on the backend internal memory usage. Exemplarily, the target recommendation content resource is determined according to the backend internal memory status available for the target application. That is, the target recommendation content resource is determined from at least one first recommendation content resource in response to the quantity of resources that the target application can occupy in the backend internal memory reaching a preset threshold. Alternatively, the target recommendation content resource is determined from at least one second recommendation content resource in response to the quantity of resources that the target application can occupy in the backend internal memory not reaching a preset threshold.

In some other embodiments, a resource loading duration corresponding to a recommendation content resource acquired from the recommendation content resource platform is determined through the device state, and a target recommendation content resource is determined according to the resource loading duration. That is, a first resource loading duration corresponding to the first recommendation content resource is determined based on the device state; a second resource loading duration corresponding to the second recommendation content resource is determined based on the device state; and a to-be-loaded recommendation content resource corresponding to the shortest resource loading duration is determined as the target recommendation content resource based on the first resource loading duration and the second resource loading duration.

Exemplarily, the target recommendation content resource may alternatively be determined through multiple device states. In this embodiment of this application, full-link time consumption is introduced as an indicator for evaluating the device state, and the indicator can indicate a current network connection state of the terminal, a terminal hardware status, and a backend internal memory usage status in real time, for example, a comprehensive status such as a central processing unit (CPU)/graphics processing unit (GPU) load. The terminal determines whether the currently selected target recommendation content resource is the first recommendation content resource or the second recommendation content resource according to the full-link time consumption. Exemplarily, the full-link time consumption includes two parts. The first part is a processing delay T1 of the terminal, that is, a processing delay T1 of the terminal caused due to the impact of the network connection state, hardware status, and backend internal memory usage status of the terminal when the terminal performs operations such as component loading, where the processing delay T1 is collected by the terminal, starts at the time when the target application is started, and ends at the time immediately before the terminal transmits the resource acquisition request to the recommendation content resource platform. The second part is a parsing delay T2, that is, a parsing delay T2 caused by the recommendation content resource platform parsing a request of the terminal and returning at least one first recommendation content resource and at least one second recommendation content resource, where the parsing delay T2 starts at the time when the terminal transmits the resource acquisition request to the recommendation content resource platform, and ends at the time when the terminal receives at least one first recommendation content resource and at least one second recommendation content resource. The sum of the processing delay T1 and the parsing delay T2 equals the full-link time consumption.

After determining a current full-link delay, the terminal acquires a delay threshold (T) from the recommendation content resource platform. The delay threshold is set by a system or updated according to a daily resource acquisition status. In an example, the recommendation content resource platform may acquire all the corresponding full-link delays (T1+T2) when the terminal selects to load the first recommendation content resource within a preset period, sort the acquired full-link delays (T1+T2) from small to large, and use a value of preset quantile (for example, 80% quantile) of the full-link delays as the delay threshold (T). Exemplarily, the recommendation content resource platform uses the delay determined within the preset period as the delay threshold (T) within the next preset period.

After acquiring the delay threshold (T) from the recommendation content resource platform, the terminal compares the determined current full-link delay (T1+T2) with the delay threshold (T), and if T1+T2<T, uses the first recommendation content resource as the target recommendation content resource.

Exemplarily, the target recommendation content resources may alternatively be jointly determined by integrating the full-link delay (T1+T2) and a device parameter. The device parameter includes at least one of a fixed parameter or a dynamic parameter such as a terminal hardware status, a network connection state, a CPU/GPU load, or a target application version number. The full-link delay (T1+T2) and device parameter are used as features, to determine the target recommendation content resource through a preset model. The preset model may be a logistic regression (LR) model or may be other machine learning models, which is not limited herein. In the development stage, the full-link delay (T1+T2), the device parameter, and whether the first recommendation content resource is successfully loaded are acquired as a training sample from model historical data. The preset model is acquired by performing training in a way of using the full-link delay (T1+T2) and the device parameter in the existing data as features, and using whether the first recommendation content resource can be successfully loaded as a positive/negative sample, where the feature of full-link delay (T1+T2) occupies a large importance (about 70%) in the entire model. In an example, a full-link delay and a device parameter of the terminal is acquired. The foregoing full-link delay and device parameter are inputted into a preset model, and a prediction result is outputted. In response to the prediction result indicating that the current state of the terminal is available for loading the recommendation content resource in real time, a target content resource is determined from at least one first recommendation content resource. Alternatively, in response to the prediction result indicating that the current state of the terminal is not available for loading the recommendation content resource in real time, a target content resource is determined from at least one second recommendation content resource.

Information (including but not limited to user device information and the like), data (including but not limited to data used for analysis, stored data, presented data, and the like) and signals involved in this application are authorized by the user or fully authorized by the parties, and the collection, use and processing of relevant data need to comply with relevant laws, regulations and standards of relevant countries and regions. For example, the device states involved in this application are all acquired with full authorization. Step 404: Load the target recommendation content resource on the target application.

In response to the target recommendation content resource determined according to the device state corresponding to the first recommendation content resource, the first recommendation content corresponding to the target recommendation content resource is read from the recommendation content resource platform in real time, and the first recommendation content is loaded to the target application. In response to the target recommendation content resource determined according to the device state corresponding to the second recommendation content resource, the second recommendation content corresponding to the target recommendation content resource is read from the preset storage area of the terminal, and the second recommendation content is loaded to the target application.

After the terminal determines the target recommendation content resource, the back-end recommendation content engine (including the direct placement engine and the ADX platform) needs to determine whether the transmitted recommendation content is successfully exposed, so as to facilitate the statistics of the exposure information of the recommendation content. Exemplarily, the terminal generates feedback information according to the determined target recommendation content resource. In an example, the feedback information includes a resource identifier, display time information, and a terminal identifier. The terminal transmits the foregoing feedback information to the recommendation content resource platform, and the recommendation content resource platform respectively returns a result of the current placement of the recommendation content resource to the direct placement engine and the ADX platform according to the foregoing feedback information. For example, the terminal determines the target recommendation content resource from at least one first recommendation content resource, and the terminal generates the corresponding feedback information and transmits the feedback information to the recommendation content resource platform. Thereafter, the recommendation content resource platform determines that the terminal loads the recommendation content resource in real time through the feedback information, and thus transmits placement success information to the corresponding ADX platform according to the resource identifier, where the placement success information includes the resource identifier, the terminal identifier and the display time information, and the recommendation content resource platform then transmits placement failure information to the direct placement engine.

Exemplarily, the display status of the recommendation content may alternatively be fed back to the back-end recommendation content engine through a blockchain. According to the determined target recommendation content resource, the terminal uses the intelligent contract to write information such as a resource identifier corresponding to the target recommendation content resource, the display time of the target recommendation content resource, a terminal identifier, and the like into the blockchain jointly. The back-end recommendation content engine may read the information in the blockchain to determine the transmitted recommendation content resource, so as to facilitate the back-end recommendation content engine to read related information from the blockchain and make statistics on the exposure status of the recommendation content resource.

In summary, in the recommendation content resource acquisition method according to the embodiments of this application, when the target application needs to present recommendation content, a target recommendation content resource is determined from a first recommendation content resource and a second recommendation content resource according to a current device state of a terminal, where the first recommendation content resource is a recommendation content resource that needs to be loaded in real time, and the second recommendation content resource is a recommendation content resource that has been preloaded. The terminal determines whether to use the preloaded recommendation content resource or the recommendation content resource loaded in real time according to the current device state, which can adaptively improve the real-time performance and loading efficiency of the loaded recommendation content resource according to the device state of the terminal.

Figure 5:
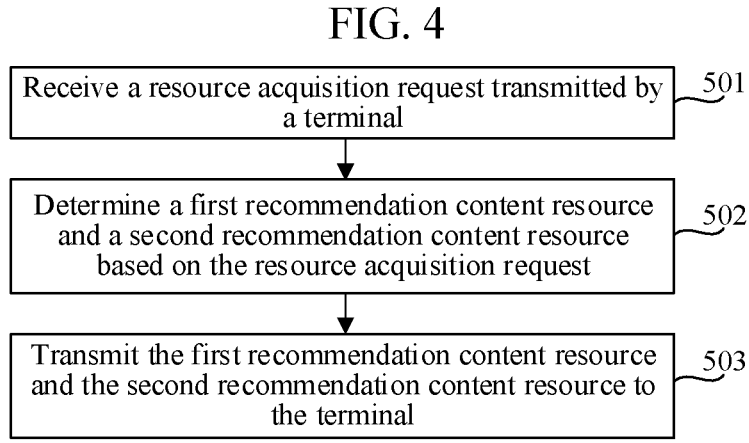
FIG. 5 is a flowchart of an advertisement resource acquisition method according to another exemplary embodiment of this application.

FIG. 5 shows a recommendation content resource acquisition method according to another exemplary embodiment of this application. In the embodiments of this application, description is made by using an example in which the method is performed by a recommendation content resource platform, and the method includes the following steps.

Step 501: Receive a resource acquisition request transmitted by a terminal.

Before receiving the resource acquisition request transmitted by the terminal, the terminal performs a preload operation on the preloaded recommendation content resource through the recommendation content resource platform. Exemplarily, the operation includes: the recommendation content resource platform receives a preload request transmitted by the terminal, determines a preloaded recommendation content resource and a preloaded resource list based on the preload request, and transmits the foregoing preloaded resource list to the terminal. The terminal sequentially loads recommendation content resources according to the preloaded resource list, and stores the loaded preloaded recommendation content resource and the preloaded resource list into the preset storage area.

Exemplarily, the resource acquisition request includes a terminal identity. After determining a preloaded resource list, the recommendation content resource platform stores the terminal identity and the preloaded resource list correspondingly. When the resource acquisition request transmitted by the terminal is received, the preloaded resource list is read according to the terminal identity carried in the resource acquisition request.

Exemplarily, the recommendation content resource platform acquires a user portrait corresponding to the terminal, and determines a preloaded recommendation content resource to be returned to the terminal according to the user portrait. In an example, a user portrait is determined according to search status in the terminal. For example, when a user searches for "diapers" multiple times using a terminal, a recommendation content resource related to mother and baby products is used as the preloaded recommendation content resource, the recommendation content resource platform performs retrieval through the direct placement engine, acquires at least one preloaded recommendation content resource, generates a corresponding preloaded resource list, and returns the foregoing preloaded recommendation content resource and the preloaded resource list to the terminal.

When detecting that the target application is started, the terminal transmits a resource acquisition request to the recommendation content resource platform, to acquire a splash screen advertisement resource for display on the target application.

Step 502: Determine a first recommendation content resource and a second recommendation content resource based on the resource acquisition request.

The first recommendation content resource is a recommendation content resource loaded in real time, and the second recommendation content resource is a preloaded recommendation content resource. Exemplarily, the recommendation content resource platform determines a corresponding preload completion list according to the resource acquisition request, determines at least one second recommendation content resource from the preload completion list, and determines at least one first recommendation content resource from a recommendation content library. Exemplarily, the recommendation content library includes, but is not limited to, a direct placement engine and/or an ADX platform.

In the embodiments of this application, description is made by using an example in which the recommendation content library is an ADX platform. After receiving the resource acquisition request, the recommendation content resource platform transmits a back-end resource acquisition request to the ADX platform. The ADX platform acquires multiple first recommendation content resources from a recommendation content library of each advertiser and/or agent accessed, and returns the multiple first recommendation content resources to the recommendation content resource platform. The recommendation content resource platform sorts multiple first recommendation content resources acquired from multiple ADX platforms according to a preset rule, and determines at least one first recommendation content resource used for being returned to the terminal.

Step 503: Transmit the first recommendation content resource and the second recommendation content resource to the terminal.

In some embodiments, the recommendation content resource platform may transmit resource information corresponding to the recommendation content resource to the terminal, that is, the determined first recommendation content resource and second recommendation content resource are indicated to the terminal through the foregoing resource information. For example, a first resource identifier corresponding to the first recommendation content resource and a second resource identifier corresponding to the second recommendation content resource are transmitted to the terminal.

The terminal determines a target recommendation content resource from at least one first recommendation content resource and at least one second recommendation content resource according to a current device state. The device state is used to indicate a running status of the terminal, and the terminal loads the target recommendation content resource on a target application.

In summary, in the recommendation content resource acquisition method according to the embodiments of this application, the recommendation content resource platform determines at least one first recommendation content resource and at least one second recommendation content resource based on the resource acquisition request transmitted by the terminal, where the first recommendation content resource is a recommendation content resource loaded in real time and the second recommendation content resource is a preloaded recommendation content resource, and returns the at least one first recommendation content resource and the at least one second recommendation content resource to the terminal. The terminal determines the target recommendation content resource according to the device state, and the target recommendation content resource is loaded on the target application, which improves the real-time performance and loading efficiency of the loaded recommendation content resource.

Figure 6:
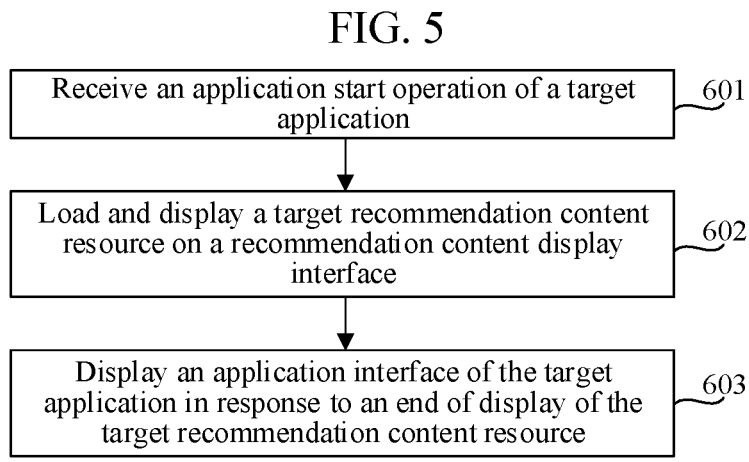
FIG. 6 is a flowchart of an advertisement resource acquisition method according to another exemplary embodiment of this application.

FIG. 6 shows a recommendation content resource acquisition method according to an exemplary embodiment of this application. In this embodiment of this application, interface display of the terminal is described, and the method includes the following steps.

Step 601: Receive an application start operation of a target application.

In this embodiment of this application, a content recommendation service is provided in a start stage of the target application. That is, in the start process of the target application, the terminal first displays a recommendation content resource. The display of the recommendation content resource in the start stage of the target application can, on one hand, improve the propagation efficiency of the recommendation content, and on the other hand, provide the terminal with sufficient time to complete the start process of the target application.

In some embodiments, the target application may be an independent application, may be a mini program in a host application, or may be an application module in an application, which is not limited herein.

Step 602: Load and display a target recommendation content resource on a recommendation content display interface.

The target recommendation content resource is a recommendation content resource determined from an acquired first recommendation content resource and an acquired second recommendation content resource according to a current device state of the terminal, the first recommendation content resource is a recommendation content resource loaded in real time, the second recommendation content resource is a preloaded recommendation content resource, and the device state is used to indicate a running status of the terminal.

In this embodiment of this application, the process of acquiring the target recommendation content resource is shown by steps 401 to 404 and steps 501 to 503, and details are not described herein again.

In some embodiments, the recommendation content display interface may be an independent application interface, or the recommendation content interface may be superimposed and displayed on the application interface of the target application.

Exemplarily, the recommendation content display interface corresponds to a display duration. In some embodiments, the display duration may be preset by a system, or may be set by a user. In some embodiments, when the target recommendation content resource is a recommendation content resource in a video form, the display duration may be a video duration corresponding to the target recommendation content resource.

The target application provides the user with an option of conveniently closing the displayed recommendation content resource, where the close option is displayed in the content recommendation display interface, and when the close option receives a trigger operation, the target application immediately closes the recommendation content display interface. Exemplarily, a setting function in the target application can further provide the user with a setting option of the recommendation content resource, and through the setting option, the content recommendation service can be closed/started. That is, after the user closes the content recommendation service through the setting option, the recommendation content display interface is not displayed when the application start operation of the target application is received.

Step 603: Display an application interface of the target application in response to an end of display of the target recommendation content resource.

The application interface is used to display application content of the target application.

In some embodiments, when a display time of the target recommendation content resource reaches the display duration, it is determined that the display of the target recommendation content resource ends. Alternatively, when the close option in the recommendation content display interface receives a trigger operation, it is determined that the display of the target recommendation content resource ends. Alternatively, when the terminal determines that the construction of the application interface of the target application is completed, it is determined that the display of the target recommendation content resource ends.

Exemplarily, in the embodiments of this application, description is made by merely using an example in which the content recommendation service is applied to a start stage of the target application. The content recommendation service may alternatively be applied to a switching process between application interfaces in the target application, a start stage in which the target application starts the application module, a buffer stage in which the target application displays content (for example, content recommendation is performed before a video application plays a certain video), and the like, which is not specifically limited hereto.

In summary, in the recommendation content resource acquisition method according to the embodiments of this application, before the target application displays a corresponding application interface, a target recommendation content resource is determined from a first recommendation content resource and a second recommendation content resource according to a current device state of a terminal, where the first recommendation content resource is a recommendation content resource that needs to be loaded in real time, and the second recommendation content resource is a recommendation content resource that has been preloaded, and the target recommendation content resource is displayed on a recommendation content display interface. The real-time performance and loading efficiency of the loaded recommendation content resource can be adaptively improved according to the device state of the terminal. Thus, the time for waiting for the loading completion of the application interface in the target application start stage is utilized to promote the recommendation content resource, which improves application start time utilization.

Figure 7:
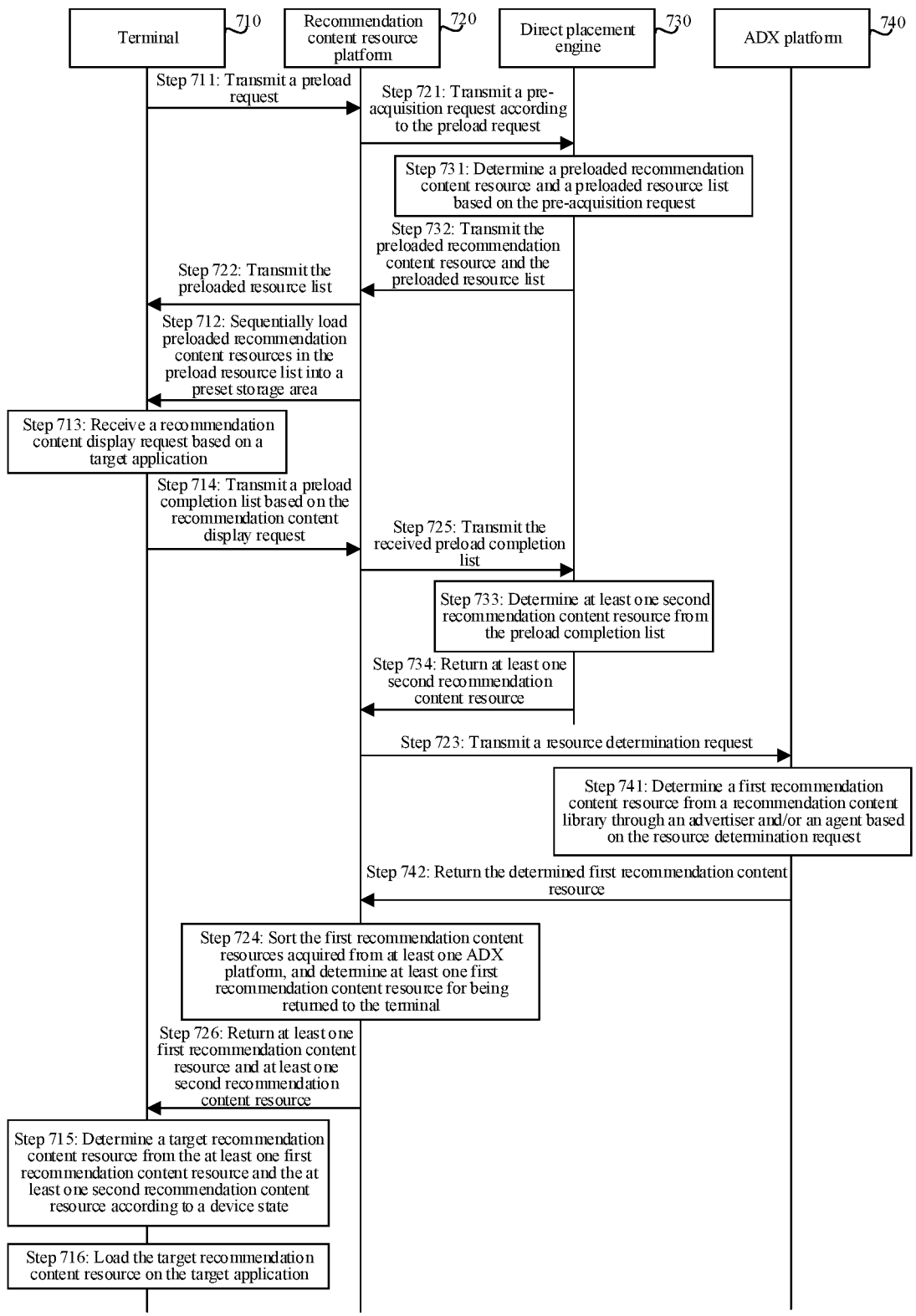
FIG. 7 is a schematic diagram of an advertisement resource acquisition system according to an exemplary embodiment of this application.

FIG. 7 shows a recommendation content resource acquisition system according to an exemplary embodiment of this application. The system includes a terminal 710, a recommendation content resource platform 720, a direct placement engine 730, and an ADX platform 740. The recommendation content resource acquisition method according to the embodiments of this application includes a preload stage and a real-time load stage.

The preload stage includes the following steps.

Step 711: The terminal 710 transmits a preload request to the recommendation content resource platform 720.

Step 721: The recommendation content resource platform 720 transmits a pre-acquisition request to the direct placement engine 730 according to the preload request.

Exemplarily, the preload request includes terminal information of the terminal, and the terminal information is used to indicate a user portrait of a terminal user. In an example, the user portrait may be determined according to information such as the type of applications installed in the terminal, an input record of the user using the terminal, a search record of the user using the terminal, and the like. The recommendation content resource platform determines corresponding demand information based on the terminal information, and generates a pre-acquisition request according to the demand information.

Step 731: The direct placement engine 730 determines a preloaded recommendation content resource and a preloaded resource list based on the pre-acquisition request.

Exemplarily, the direct placement engine may determine demand information of the terminal through the pre-acquisition request, acquire a preset number of preloaded recommendation content resources from the recommendation content library corresponding to the direct placement engine according to the demand information, and correspondingly generate a preloaded resource list.

The preset number may be set by a system, or may be determined according to an internal memory state of the terminal. For example, the direct placement engine acquires the internal memory state of the terminal through the recommendation content resource platform, acquires a first preset number of preloaded recommendation content resources in response to the remaining internal memory space corresponding to the internal memory state of the terminal reaching a preset percentage, or acquires a second preset number of preloaded recommendation content resources in response to the remaining internal memory space corresponding to the internal memory state of the terminal being less than the preset percentage, where the first preset number is greater than the second preset number.

Step 732: The direct placement engine 730 transmits the preloaded recommendation content resource and the preloaded resource list to the recommendation content resource platform 720.

Step 722: The recommendation content resource platform 720 transmits the preloaded resource list to the terminal 710.

Step 712: The terminal 710 sequentially loads the preloaded recommendation content resources in the preloaded resource list from the recommendation content resource platform 720 into a preset storage area.

The real-time load stage includes the following steps.

Step 713: the terminal 710 receives a recommendation content display request based on a target application.

Step 714: The terminal 710 transmits a preload completion list to the recommendation content resource platform 720 based on the recommendation content display request.

Step 723: The recommendation content resource platform 720 transmits a resource determination request to the ADX platform 740.

Exemplarily, the resource determination request includes terminal information of the terminal 710, and the terminal information is used to indicate a user portrait of a terminal user.

Step 741: The ADX platform 740 determines, based on the resource determination request, a first recommendation content resource from a recommendation content library through an advertiser and/or an agent.

According to the terminal information, the ADX platform 740 acquires the first recommendation content resource from the recommendation content library of the advertiser and/or the agent. Exemplarily, the ADX platform 740 determines, according to the terminal information, effective Cost Per Mile (eCPM) corresponding to the recommendation content resource acquired from the recommendation content library of the advertiser and/or the agent, sorts the acquired recommendation content resources according to eCPM corresponding to each recommendation content resource, and acquires at least one first recommendation content resource. In an example, to prevent multi-stage billing problems, one ADX platform 740 determines one first recommendation content resource.

Step 742: The ADX platform 740 returns the determined first recommendation content resource to the recommendation content resource platform 720.

Step 724: The recommendation content resource platform 720 sorts the first recommendation content resources acquired from at least one ADX platform 740, and determines at least one first recommendation content resource for being returned to the terminal 710.

The recommendation content resource platform 720 accesses at least one ADX platform 740. When the recommendation content resource platform 720 accesses multiple ADX platforms 740, the first recommendation content resources acquired from the respective ADX platforms 740 are sorted according to a preset rule, and at least one first recommendation content resource for being returned to the terminal 710 is determined. The preset rule may be determined by a click-through rate, a conversion rate, and the like corresponding to the first recommendation content resource. Exemplarily, the recommendation content resource platform 720 sorts the first recommendation content resources by determining eCPM of each first recommendation content resource, and returns at least one first recommendation content resource at the queue front end of the sort queue to the terminal 710.

Step 725: The recommendation content resource platform 720 transmits the received preload completion list to the direct placement engine 730.

Step 733: The direct placement engine 730 determines at least one second recommendation content resource from the preload completion list.

Exemplarily, the direct placement engine 730 determines a recommendation content resource that has been preloaded by the terminal according to the preload completion list, and determines whether the recommendation content resource is valid. From the recommendation content resources determined to be valid, at least one second recommendation content resource is determined according to a click-through rate and/or a conversion rate corresponding to the recommendation content resource.

Step 734: The direct placement engine 730 returns at least one second recommendation content resource to the recommendation content resource platform 720.

Steps 723 to 724 and steps 725 to 734 may be performed at the same time.

Step 726: The recommendation content resource platform 720 returns at least one first recommendation content resource and at least one second recommendation content resource to the terminal 710.

Step 715: According to a device state, the terminal 710 determines a target recommendation content resource from the at least one first recommendation content resource and the at least one second recommendation content resource.

Exemplarily, the device state includes a terminal-related status such as a network connection state, a backend internal memory usage status, or a terminal hardware status. In the embodiments of this application, a target recommendation content resource is determined by comprehensively determining the foregoing multiple device states, that is, full-link time consumption is taken as an indicator for evaluating the device state. The target recommendation content resource is determined from at least one first recommendation content resource in accordance with a determination that the current full-link delay is less than the delay threshold. The target recommendation content resource is determined from at least one second recommendation content resource in accordance with a determination that the current full-link delay reaches the delay threshold. When the number of the first recommendation content resource/the second recommendation content resource is greater than 1, the target recommendation content resource is determined from at least one first recommendation content resource/at least one second recommendation content resource according to the loading duration corresponding to the recommendation content resource. In an example, when the target recommendation content resource is determined from two or more first recommendation content resources, the loading duration corresponding to each first recommendation content resource is determined, and a first recommendation content resource corresponding to the shortest loading duration is selected as the target recommendation content resource.

Step 716: The terminal 710 loads the target recommendation content resource on the target application.

In summary, in the recommendation content resource acquisition system according to the embodiments of this application, when the target application needs to present recommendation content, a target recommendation content resource is determined from a first recommendation content resource and a second recommendation content resource according to a current device state of a terminal, where the first recommendation content resource is a recommendation content resource that needs to be loaded in real time, and the second recommendation content resource is a recommendation content resource that has been preloaded. The terminal determines whether to use the preloaded recommendation content resource or the recommendation content resource loaded in real time according to the current device state, which can adaptively improve the real-time performance and loading efficiency of the loaded recommendation content resource according to the device state of the terminal.

Figure 8:
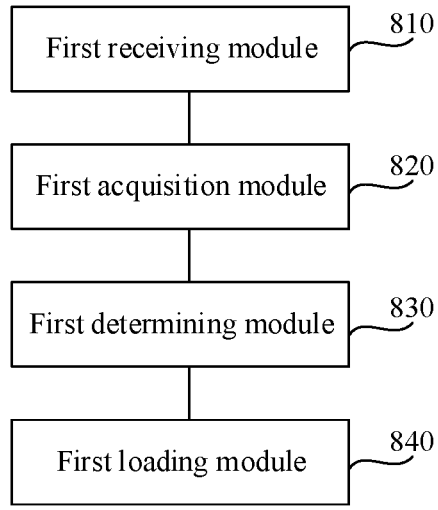
FIG. 8 is a structural block diagram of a recommendation content resource acquisition apparatus according to an exemplary embodiment of this application.

FIG. 8 is a structural block diagram of a recommendation content resource acquisition apparatus according to an exemplary embodiment of this application. The apparatus includes:

a first receiving module 810, configured to receive a recommendation content display request based on a target application;

a first acquisition module 820, configured to acquire a first recommendation content resource and a second recommendation content resource based on the recommendation content display request, the first recommendation content resource being a recommendation content resource loaded in real time, and the second recommendation content resource being a preloaded recommendation content resource;

a first determining module 830, configured to determine a target recommendation content resource from the first recommendation content resource and the second recommendation content resource according to a current device state of a terminal, the device state indicating a running status of the terminal; and a first loading module 840, configured to load the target recommendation content resource on the target application.

In an optional embodiment, the device state includes a network connection state;

the first determining module 830 is further configured to determine a current network connection state of the terminal; and the first determining module 830 is further configured to determine the target recommendation content resource from the first recommendation content resource and the second recommendation content resource based on the network connection state.

In an optional embodiment, the first determining module 830 is further configured to determine the target recommendation content resource from at least one first recommendation content resource in accordance with a determination that the network connection is to a wireless fidelity network.

In an optional embodiment, the apparatus further comprises:

a first reading module (not shown), configured to read first recommendation content corresponding to the target recommendation content resource from a recommendation content resource platform in real time; and the first loading module 840 is further configured to load the first recommendation content on the target application.

In an optional embodiment, the first determining module 830 is further configured to determine the target recommendation content resource from at least one second recommendation content resource in accordance with a determination that the network connection is to a cellular network.

In an optional embodiment, the first reading module is further configured to read second recommendation content corresponding to the target recommendation content resource from a preset storage area of the terminal; and the first loading module 840 is further configured to load the second recommendation content on the target application.

In an optional embodiment, the first receiving module 810 is further configured to receive a preloaded resource list returned by the recommendation content resource platform;

the first receiving module 810 is further configured to acquire a preload resource from the recommendation content resource platform based on the preloaded resource list; and the apparatus further comprises:

a first storage module (not shown), configured to store the preload resource into the preset storage area of the terminal.

In an optional embodiment, the apparatus further comprises:

a first transmission module (not shown), configured to transmit a preload completion list to the recommendation content resource platform based on the recommendation display request, wherein the preload completion list comprises recommendation content resources that have been preloaded, and the recommendation content resource platform is used for determining the second recommendation content resource from the preload completion list.

In an optional embodiment, the first determining module 830 is further configured to determine a first resource loading duration corresponding to the first recommendation content resource based on the device state;

the first determining module 830 is further configured to determine a second resource loading duration corresponding to the second recommendation content resource based on the device state; and the first determining module 830 is further configured to determine a to-be-loaded recommendation content resource corresponding to the shortest resource loading duration as the target recommendation content resource based on the first resource loading duration and the second resource loading duration.

In summary, according to a recommendation content display request based on the target application, the recommendation content resource acquisition apparatus according to the embodiments of this application acquires at least one first recommendation content resource and at least one second recommendation content resource, where the first recommendation content resource is a recommendation content resource loaded in real time and the second recommendation content resource is a preloaded recommendation content resource. Then, the recommendation content resource acquisition apparatus determines a target recommendation content resource for being loaded to the target application from the first recommendation content resource and the second recommendation content resource described above according to a device state of the terminal. The terminal determines whether to use the preloaded recommendation content resource or the recommendation content resource loaded in real time as the recommendation content resource to be loaded on the target application according to the current device state, which improves the real-time performance and loading efficiency of the loaded recommendation content resource.

Figure 9:
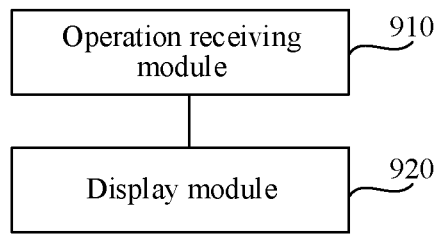
FIG. 9 is a structural block diagram of a recommendation content resource acquisition apparatus according to another exemplary embodiment of this application.

FIG. 9 is a structural block diagram of a recommendation content resource acquisition apparatus according to another exemplary embodiment of this application. The apparatus includes:

an operation receiving module 910, configured to receive an application start operation of a target application; and a display module 920, configured to load and display a target recommendation content resource on a recommendation content display interface, the target recommendation content resource being a recommendation content resource determined from an acquired first recommendation content resource and an acquired second recommendation content resource according to a current device state of a terminal, the first recommendation content resource being a recommendation content resource loaded in real time, the second recommendation content resource being a preloaded recommendation content resource, and the device state indicating a running status of the terminal, the display module 920 being further configured to display an application interface of the target application in accordance with a determination that a display of the target recommendation content resource has ended, the application interface being used for displaying application content of the target application.

In summary, in the recommendation content resource acquisition apparatus according to the embodiments of this application, before the target application displays a corresponding application interface, a target recommendation content resource is determined from a first recommendation content resource and a second recommendation content resource according to a current device state of a terminal, where the first recommendation content resource is a recommendation content resource that needs to be loaded in real time, and the second recommendation content resource is a recommendation content resource that has been preloaded, and the target recommendation content resource is displayed on a recommendation content display interface. The real-time performance and loading efficiency of the loaded recommendation content resource can be adaptively improved according to the device state of the terminal. Thus, the time for waiting for the loading completion of the application interface in the target application start stage is utilized to promote the recommendation content resource, which improves application start time utilization.

Figure 10:
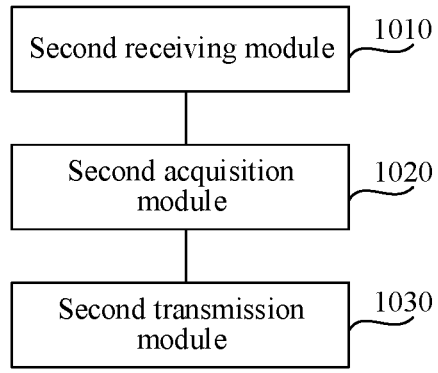
FIG. 10 is a structural block diagram of a recommendation content resource acquisition apparatus according to another exemplary embodiment of this application.

FIG. 10 is a structural block diagram of a recommendation content resource acquisition apparatus according to another exemplary embodiment of this application. The apparatus includes:

a second receiving module 1010, configured to receive a resource acquisition request transmitted by a terminal;

a second acquisition module 1020, configured to determine a first recommendation content resource and a second recommendation content resource based on the resource acquisition request, the first recommendation content resource being a recommendation content resource loaded in real time, and the second recommendation content resource being a preloaded recommendation content resource; and a second transmission module 1030, configured to transmit the first recommendation content resource and the second recommendation content resource to the terminal, the terminal being configured to determine a target recommendation content resource from the first recommendation content resource and the second recommendation content resource according to a current device state, the device state indicating a running status of the terminal, and the terminal being configured to load the target recommendation content resource on a target application.

In an optional embodiment, the second receiving module 1010 is further configured to receive a preload request transmitted by the terminal;

the apparatus further comprises:
a second determining module (not shown), configured to determine a preloaded recommendation content resource and a preloaded resource list based on the preload request; and the second transmission module 1030 is further configured to transmit the preloaded resource list to the terminal, where the terminal is configured to acquire a preload resource from the recommendation content resource platform based on the preloaded resource list, and store the acquired preload resource into a preset storage area of the terminal.

In an optional embodiment, the second receiving module 1010 is further configured to receive a preload completion list transmitted by the terminal, where the preload completion list comprises recommendation content resources that have been preloaded in the terminal; and the second determining module 1010 is further configured to determine the second recommendation content resource from the preload completion list.

In summary, in the recommendation content resource acquisition apparatus according to the embodiments of this application, the recommendation content resource platform determines at least one first recommendation content resource and at least one second recommendation content resource based on the resource acquisition request transmitted by the terminal, where the first recommendation content resource is a recommendation content resource loaded in real time and the second recommendation content resource is a preloaded recommendation content resource, and returns the at least one first recommendation content resource and the at least one second recommendation content resource to the terminal. The terminal determines the target recommendation content resource according to the device state, and the target recommendation content resource is loaded on the target application, which improves the real-time performance and loading efficiency of the loaded recommendation content resource.

The recommendation content resource acquisition apparatus provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In addition, the recommendation content resource acquisition apparatus and recommendation content resource acquisition method embodiments provided in the foregoing embodiments belong to the same conception. For the specific implementation process, reference may be made to the method embodiments, and details are not described herein again.

Figure 11:
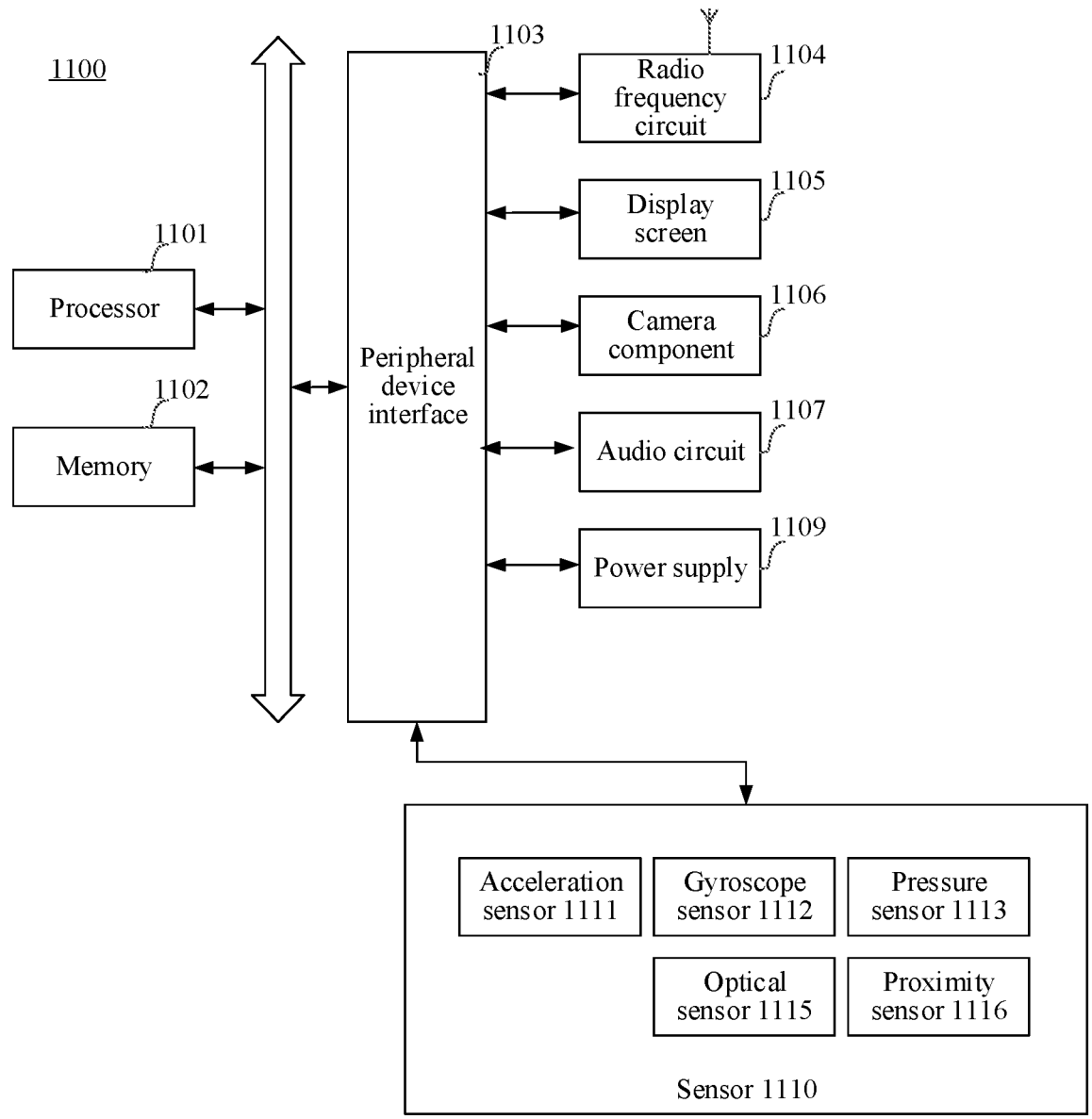
FIG. 11 is a structural block diagram of a terminal according to an exemplary embodiment of this application.

FIG. 11 is a structural block diagram of a terminal 1100 according to an exemplary embodiment of this application. The terminal 1100 may be: a smartphone, a tablet computer, a moving picture experts group audio layer III (MP3) player, a moving picture experts group audio layer IV (MP4) player, a notebook computer, or a desktop computer. The terminal 1100 may also be referred to as another name such as user device, a portable terminal, a laptop terminal, or a desktop terminal.

Generally, the terminal 1100 includes: a processor 1101 and a memory 1102.

The processor 1101 may comprise one or more processing cores, and may be, for example, a 4-core processor or an 8-core processor.

The memory 1102 may comprise one or more computer-readable storage media that may be non-transitory.

In some embodiments, the terminal 1100 may include a peripheral device interface 1103 and at least one peripheral device. The processor 1101, the memory 1102, and the peripheral device interface 1103 may be connected through a bus or a signal cable. Each peripheral device may be connected to the peripheral device interface 1103 through a bus, a signal cable, or a circuit board. Specifically, the peripheral device includes: at least one of a radio frequency circuit 1104, a display screen 1105, a camera assembly 1106, an audio circuit 1107, and a power supply 1109.

The peripheral device interface 1103 may be configured to connect the at least one peripheral device related to Input/Output (I/O) to the processor 1101 and the memory 1102.

The radio frequency circuit 1104 is configured to receive and transmit a radio frequency (RF) signal that is also referred to as an electromagnetic signal.

The display screen 1105 is configured to display a user interface (UI).

The camera component 1106 is configured to collect images or videos.

The audio circuit 1107 may comprise a microphone and a speaker.

The power supply 1109 is configured to supply power to components in the terminal 1100.

In some embodiments, the terminal 1100 further comprises one or more sensors 1110. The one or more sensors 1110 comprise but are not limited to an acceleration sensor 1111, a gyro sensor 1112, a pressure sensor 1113, an optical sensor 1115, and a proximity sensor 1116.

A person skilled in the art may understand that the structure shown in FIG. 11 constitutes no limitation on the terminal 1100, and the terminal may comprise more or fewer components than those shown in the figure, or some components may be combined, or a different component deployment may be used A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium comprised in the memory in the foregoing embodiment, or may be a computer-readable storage medium that exists independently and that is not assembled in a terminal. The computer-readable storage medium stores at least one instruction, at least one program, a code set, or an instruction set, the at least one instruction, the at least one program, the code set or the instruction set being loaded and executed by the processor to implement the recommendation content resource acquisition method according to any one of the foregoing embodiments.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In some embodiments, the computer-readable storage medium may include: a ROM, a RAM, a solid state drive (SSD), an optical disc, or the like. The RAM may comprise a resistive RAM (ReRAM) and a dynamic RAM (DRAM). The sequence numbers of the foregoing embodiments of this application are merely for description purpose, and do not indicate the preference among the embodiments.

What is claimed is:

1. A recommendation content resource acquisition method performed by a terminal, the method comprising:
receiving a recommendation content display request based on a target application accessed by a user of the terminal;
acquiring a first recommendation content resource and a second recommendation content resource based on the recommendation content display request, the first recommendation content resource being a recommendation content resource loaded from a recommendation content resource platform in real time matching the recommendation content display request, and the second recommendation content resource being a preloaded recommendation content resource matching a user profile of the user of the terminal;
determining a target recommendation content resource from the first recommendation content resource and the second recommendation content resource according to a current device state of the terminal indicative of a running status of the terminal, further including:
determining a full-link delay for the first recommendation content resource based on the current device state of the terminal, the full-link delay including (i) a processing delay from the target application being launched to the target application transmitting the recommendation content display request and (ii) a parsing delay from the terminal transmitting a resource acquisition request to the recommendation content resource platform to the terminal receiving the first recommendation content resource;
selecting the first recommendation content resource as the target recommendation content resource when the full-link delay is less than a predefined delay threshold; and
selecting the second recommendation content resource as the target recommendation content resource when the full-link delay is no less than the predefined delay threshold; and
loading the target recommendation content resource on the target application.

2. The method according to claim 1, wherein the current device state comprises a network connection; and
determining the target recommendation content resource from the first recommendation content resource and the second recommendation content resource according to a current device state of the terminal comprises:
determining a current network connection state of the terminal; and
selecting the target recommendation content resource from the first recommendation content resource and the second recommendation content resource based on the network connection.

3. The method according to claim 2, wherein selecting the target recommendation content resource from the first recommendation content resource and the second recommendation content resource based on the network connection comprises:
in accordance with a determination that the network connection is to a wireless fidelity network: selecting the target recommendation content resource from at least one first recommendation content resource.

4. The method according to claim 3, wherein loading the target recommendation content resource on the target application comprises:
reading, in real time, first recommendation content corresponding to the target recommendation content resource from the recommendation content resource platform; and
loading the first recommendation content on the target application.

5. The method according to claim 2, wherein determining the target recommendation content resource from the first recommendation content resource and the second recommendation content resource based on the network connection comprises:
in accordance with a determination that the network connection is to a cellular network: selecting the target recommendation content resource from at least one second recommendation content resource.

6. The method according to claim 5, wherein loading the target recommendation content resource on the target application comprises:
reading second recommendation content corresponding to the target recommendation content resource from a preset storage area of the terminal; and
loading the second recommendation content on the target application.

7. The method according to claim 1, the method further comprising:
before receiving a recommendation content display request based on a target application,
transmitting a preload request to the recommendation content resource platform;
receiving a preloaded resource list returned by the recommendation content resource platform;
acquiring a preload resource from the recommendation content resource platform based on the preloaded resource list; and
storing the preload resource in a preset storage area of the terminal.

8. The method according to claim 7, the method further comprising:
after receiving a recommendation content display request based on a target application:
transmitting a preload completion list to the recommendation content resource platform based on the recommendation display request, wherein the preload completion list comprises recommendation content resources that have been preloaded, and the recommendation content resource platform is used for determining the second recommendation content resource from the preload completion list.

9. The method according to claim 1, wherein determining a target recommendation content resource from the first recommendation content resource and the second recommendation content resource according to a current device state of the terminal comprises:
determining a first resource loading duration corresponding to the first recommendation content resource based on the current device state;
determining a second resource loading duration corresponding to the second recommendation content resource based on the current device state; and determining a to-be-loaded recommendation content resource corresponding to a shortest resource loading duration as the target recommendation content resource based on the first resource loading duration and the second resource loading duration.

10. The method according to claim 1, further comprising:
receiving an application start operation of a target application;
loading and displaying the target recommendation content resource on a recommendation content display interface; and
in accordance with a determination that a display of the target recommendation content resource has ended, displaying an application interface for displaying application content of the target application.

11. An electronic device, comprising:
one or more processors; and
memory storing one or more programs, the one or more programs comprising instructions that, when executed by the one or more processors, cause the one or more processors to perform operations comprising:
receiving a recommendation content display request based on a target application accessed by a user of the terminal;
acquiring a first recommendation content resource and a second recommendation content resource based on the recommendation content display request, the first recommendation content resource being a recommendation content resource loaded from a recommendation content resource platform in real time matching the recommendation content display request, and the second recommendation content resource being a preloaded recommendation content resource matching a user profile of the user of the terminal;
determining a target recommendation content resource from the first recommendation content resource and the second recommendation content resource according to a current device state of the terminal indicative of a running status of the terminal, further including:
determining a full-link delay for the first recommendation content resource based on the current device state of the terminal, the full-link delay including (i) a processing delay from the target application being launched to the target application transmitting the recommendation content display request and (ii) a parsing delay from the terminal transmitting a resource acquisition request to the recommendation content resource platform to the terminal receiving the first recommendation content resource;
selecting the first recommendation content resource as the target recommendation content resource when the full-link delay is less than a predefined delay threshold; and
selecting the second recommendation content resource as the target recommendation content resource when the full-link delay is no less than the predefined delay threshold; and
loading the target recommendation content resource on the target application.

12. The electronic device according to claim 11, wherein the current device state comprises a network connection; and
determining the target recommendation content resource from the first recommendation content resource and the second recommendation content resource according to a current device state of the terminal comprises:
determining a current network connection state of the terminal; and selecting the target recommendation content resource from the first recommendation content resource and the second recommendation content resource based on the network connection.

13. The electronic device according to claim 12, wherein selecting the target recommendation content resource from the first recommendation content resource and the second recommendation content resource based on the network connection comprises:
in accordance with a determination that the network connection is to a wireless fidelity network: selecting the target recommendation content resource from at least one first recommendation content resource.

14. The electronic device according to claim 13, wherein loading the target recommendation content resource on the target application comprises:
reading, in real time, first recommendation content corresponding to the target recommendation content resource from a recommendation content resource platform; and
loading the first recommendation content on the target application.

15. The electronic device according to claim 12, wherein determining the target recommendation content resource from the first recommendation content resource and the second recommendation content resource based on the network connection comprises:
in accordance with a determination that the network connection is to a cellular network: selecting the target recommendation content resource from at least one second recommendation content resource.

16. The electronic device according to claim 15, wherein loading the target recommendation content resource on the target application comprises:
reading second recommendation content corresponding to the target recommendation content resource from a preset storage area of the terminal; and
loading the second recommendation content on the target application.

17. The electronic device according to claim 11, the method further comprising:
before receiving a recommendation content display request based on a target application,
transmitting a preload request to the recommendation content resource platform;
receiving a preloaded resource list returned by the recommendation content resource platform;
acquiring a preload resource from the recommendation content resource platform based on the preloaded resource list; and
storing the preload resource in a preset storage area of the terminal.

18. A non-transitory computer-readable storage medium, storing a computer program, the computer program, when executed by one or more processors of an electronic device, causing the one or more processors to perform operations comprising:
receiving a recommendation content display request based on a target application accessed by a user of the terminal;
acquiring a first recommendation content resource and a second recommendation content resource based on the recommendation content display request, the first recommendation content resource being a recommendation content resource loaded from a recommendation content resource platform in real time matching the recommendation content display request, and the second recommendation content resource being a preloaded recommendation content resource matching a user profile of the user of the terminal;

determining a target recommendation content resource from the first recommendation content resource and the second recommendation content resource according to a current device state of the terminal indicative of a running status of the terminal, further including:

determining a full-link delay for the first recommendation content resource based on the current device state of the terminal, the full-link delay including (i) a processing delay from the target application being launched to the target application transmitting the recommendation content display request and (ii) a parsing delay from the terminal transmitting a resource acquisition request to the recommendation content resource platform to the terminal receiving the first recommendation content resource;

selecting the first recommendation content resource as the target recommendation content resource when the full-link delay is less than a predefined delay threshold; and selecting the second recommendation content resource as the target recommendation content resource when the full-link delay is no less than the predefined delay threshold; and loading the target recommendation content resource on the target application.

19. The non-transitory computer-readable storage medium according to claim 18, wherein the current device state comprises a network connection; and determining the target recommendation content resource from the first recommendation content resource and the second recommendation content resource according to a current device state of the terminal comprises:

determining a current network connection state of the terminal; and selecting the target recommendation content resource from the first recommendation content resource and the second recommendation content resource based on the network connection.

20. The non-transitory computer-readable storage medium according to claim 19, wherein selecting the target recommendation content resource from the first recommendation content resource and the second recommendation content resource based on the network connection comprises:

in accordance with a determination that the network connection is to a wireless fidelity network: selecting the target recommendation content resource from at least one first recommendation content resource.

* * * * *